(12) United States Patent
Blancas et al.

(10) Patent No.: US 7,165,718 B2
(45) Date of Patent: Jan. 23, 2007

(54) IDENTIFICATION OF AN INDIVIDUAL USING A MULTIPLE PURPOSE CARD

(75) Inventors: Irma Blancas, San Antonio, TX (US); Karl F. Krimmel, San Antonio, TX (US)

(73) Assignee: Pathway Enterprises, Inc., San Antonio, TX (US)

( * ) Notice: Subject to any disclaimer, the term of this patent is extended or adjusted under 35 U.S.C. 154(b) by 19 days.

(21) Appl. No.: 10/331,424

(22) Filed: Dec. 30, 2002

(65) Prior Publication Data

US 2003/0132285 A1 Jul. 17, 2003

Related U.S. Application Data

(60) Provisional application No. 60/349,105, filed on Jan. 16, 2002.

(51) Int. Cl.
G06K 5/00 (2006.01)
G06F 17/00 (2006.01)

(52) U.S. Cl. .................. 235/380; 235/375; 235/382

(58) Field of Classification Search ............ 235/375, 235/380, 381, 382; 705/39, 67; 713/155–159, 713/200
See application file for complete search history.

(56) References Cited

U.S. PATENT DOCUMENTS

| | | | |
|---|---|---|---|
| 4,218,738 A | 8/1980 | Matyas |
| 4,223,403 A | 9/1980 | Konheim |
| 4,393,269 A | 7/1983 | Konheim |
| 4,650,975 A | 3/1987 | Kitchener |
| 4,742,351 A | 5/1988 | Suzuki |
| 4,783,823 A | 11/1988 | Tasaki |
| 4,849,613 A | 7/1989 | Eisele |
| 4,879,747 A | 11/1989 | Leighton |
| 4,912,308 A | 3/1990 | Takahira |
| 4,993,068 A | 2/1991 | Piosenka |
| 4,995,081 A | 2/1991 | Leighton |
| 5,261,002 A | 11/1993 | Perlman |
| 5,379,344 A | 1/1995 | Larsson |
| 5,434,917 A | 7/1995 | Naccache |
| 5,604,804 A | 2/1997 | Micali |
| 5,657,389 A | 8/1997 | Houvener |
| 5,659,616 A | 8/1997 | Sudia |
| 5,666,416 A | 9/1997 | Micali |
| 5,668,874 A | 9/1997 | Kristol |

(Continued)

OTHER PUBLICATIONS

Department of Defense (DOD) Public Key Infrastructure (PKI) Mayer, Daryl, Master Sgt. article New technology, smartcard a secure combination for e-mail, Dec. 7, 2001, p. 2, Manscom AFB website.

(Continued)

*Primary Examiner*—Thien M. Le
*Assistant Examiner*—April A. Taylor (57) ABSTRACT

The present invention relates to the identification of an individual to other entities. A certifying authority verifies the identity of an individual. Upon authentication, the certifying authority issues a multiple purpose card with the individual's information, a public key and a private key associated with the user. The certifying authority indicates the revoking of the digital certificate by removing it from the access active list.

Technology can be used for good or evil. However, as understanding builds upon understanding, technology has unintended consequences not foreseen by the inventors. Our hope is that this technology is only used for the purpose of increasing the quality of life for humans.

8 Claims, 8 Drawing Sheets

U.S. PATENT DOCUMENTS

| | | |
|---|---|---|
| 5,694,471 A | 12/1997 | Chen |
| 5,717,759 A | 2/1998 | Micali |
| 5,717,776 A | 2/1998 | Watanabe |
| 5,721,781 A * | 2/1998 | Deo et al. .................. 705/67 |
| 5,745,571 A | 4/1998 | Zuk |
| 5,790,667 A | 8/1998 | Omori |
| 5,790,674 A | 8/1998 | Houvener |
| 5,790,677 A | 8/1998 | Fox |
| 5,958,050 A | 9/1999 | Griffin |
| 5,979,941 A | 11/1999 | Mosher |
| 5,982,898 A | 11/1999 | Hsu |
| 5,995,630 A | 11/1999 | Borza |
| 6,005,939 A | 12/1999 | Fortenberry |
| 6,005,942 A | 12/1999 | Chan |
| 6,035,402 A | 3/2000 | Vaeth |
| 6,038,551 A | 3/2000 | Barlow |
| 6,041,410 A | 3/2000 | Hsu |
| 6,070,191 A | 5/2000 | Houvener et al. |
| 6,073,242 A | 6/2000 | Hardy |
| 6,076,162 A | 6/2000 | Deindl |
| 6,081,610 A | 6/2000 | Dwork |
| 6,088,805 A | 7/2000 | Davis |
| 6,092,196 A | 7/2000 | Reiche |
| 6,105,011 A | 8/2000 | Morrison |
| 6,144,743 A | 11/2000 | Yamada |
| 6,161,181 A | 12/2000 | Haynes, III |
| 6,185,316 B1 | 2/2001 | Buffam |
| 6,208,998 B1 | 3/2001 | Marcus |
| 6,212,634 B1 | 4/2001 | Geer |
| 6,219,439 B1 | 4/2001 | Burger |
| 6,220,510 B1 | 4/2001 | Everett |
| 6,224,109 B1 | 5/2001 | Yang |
| 6,226,744 B1 | 5/2001 | Murphy |
| 6,230,267 B1 | 5/2001 | Richards |
| 6,256,734 B1 | 7/2001 | Blaze |
| 6,263,447 B1 | 7/2001 | French |
| 6,282,658 B1 | 8/2001 | French |
| 6,292,897 B1 | 9/2001 | Gennaro |
| 6,314,517 B1 | 11/2001 | Moses |
| 6,321,339 B1 | 11/2001 | French |
| 6,324,645 B1 | 11/2001 | Andrews |
| 6,338,138 B1 | 1/2002 | Raduchel |
| 6,339,824 B1 | 1/2002 | Smith |
| 6,351,812 B1 | 2/2002 | Datar |
| 6,353,812 B1 | 3/2002 | Frankel |
| 6,367,009 B1 | 4/2002 | Davis |
| 6,367,011 B1 | 4/2002 | Lee |
| 6,378,075 B1 | 4/2002 | Goldstein |
| 6,430,688 B1 | 8/2002 | Kohl |
| 6,438,550 B1 | 8/2002 | Doyle |
| 6,609,659 B1 * | 8/2003 | Sehr ..................... 235/384 |
| 6,810,479 B1 * | 10/2004 | Barlow et al. ............. 713/185 |
| 2001/0026634 A1 | 10/2001 | Yamaguchi |
| 2001/0034718 A1 | 10/2001 | Shaked |
| 2001/0034834 A1 | 10/2001 | Matsuyama |
| 2001/0037312 A1 | 11/2001 | William |
| 2001/0048023 A1 | 12/2001 | Fitzmaurice |
| 2001/0049785 A1 | 12/2001 | Kawan |
| 2001/0054154 A1 | 12/2001 | Tim |
| 2001/0056487 A1 | 12/2001 | Yoo |

OTHER PUBLICATIONS

Blancas, Irma, Unsolicated Proposal Development and Impletmentation of a U.S. Postal Service administered Local Registration Infrastructure Supporting Digital Signing and Encryption of Email, Jun. 19, 2000.

Williams Mathews, USPS poised to offer digital certificates, Mar. 12, 2001, Federal Computer Week Magazine.

United States Postal Service Certificate Policy for Electronic Identity Certificates, Version 0.8, Oct. 2001.

* cited by examiner

FIG. 1

Description of the Public Key Infrastructure Certificate Authority

FIG. 2

Public Key Infrastructure Active Access List

Multiple Purpose Card

Card serial number
520

Components of Card Memory: 530
    Unprotected Cache 540
        Medical Alert
        Donor Information
    Protected cache 550
        Digital Certificate 560
            Version
            Certificate Policies
            Signature algorithm
            Issuer
            Valid From
            Valid To
            Public Key
            AAL Distribution Point
            Thumbprint algorithm
            Thumbprint
            Image
            Citizenship
            Date of Birth
            Gender
            Social Security Number
            State Issued Driver's License
    Personal Information 570 (accessed by knowledge of PIN)
        Private Key
        Subject/Name

Description of the Multi-Purpose Card with an Image for Offline Verification

IDENTIFICATION OF AN INDIVIDUAL USING A MULTIPLE PURPOSE CARD

CROSS REFERENCE TO RELATED APPLICATION

This application claims the benefit of Provisional Patent Application Ser. Nr. 60/349,105 filed 2002 Jan. 16. That provisional application is incorporated herein by reference for all purposes.

FEDERALLY SPONSORED RESEARCH

Not Applicable

SEQUENCE LISTING OR PROGRAM

Not Applicable

BACKGROUND—FIELD OF INVENTION

The method of the invention relates to the identification of individuals for multiple purposes using a card. The specific field includes information and security in particular public key infrastructure.

BACKGROUND—DESCRIPTION OF PRIOR ART

Ensuring an individual's identity is a critical factor to transactions. Transactions refer to the ability to do, perform, carry out, manage or conduct an act, transfer of information including transfer of "data", "records", or other information that requires the identification of an individual to perform that act. Multiple entities verify an individual's identity and issue individual identification cards—driver's license, passport, business identification card, social security number, bank account and facility access cards. In some cases, individual identities are verified by using another entities identification card.

There have been many approaches to the problem of identifying individuals. The methods and systems emphasize various aspects of identifying individuals based upon the purpose for the identification. Some patents have focused on creating a plastic identification card with visible or non-visible security markings to prevent forgery of the card (U.S. Pat. No. 5,434,917). On the online world (Internet), identifying individuals has been done through the use of passwords or personal information (U.S. Pat. Nos. 6,263,447 and 6,321,339).

Other patents have used the public/private digital certificate key issued by a certifying authority to validate an individual's identity. Smart card technology has been incorporated with the digital certificate (U.S. Pat. No. 5,745,571). This has further evolved to include biometrics such as fingerprints with a Personal Identification Number (U.S. Pat. No. 5,995,630). Smart cards now have multi-applications within them to identify individuals to various entities (U.S. Pat. No. 5,659,616). Many of these inventions are so complex that the ordinary individual does not understand them resulting in their lack of trust in these systems and methods. Below we will describe further the attempts to solve the problem of identifying individuals.

Forgery of People's Identity

Advancements in printer quality make it easy to counterfeit these forms of identification. Patents on preventing identification card forgery and subsequently a person's identity, focus on the way the card is manufactured. Cards are being manufactured with visible or non-visible security markings.

A criminal can steal an identification card. Physically impersonate the individual based on the picture, and conduct transactions on behalf of the unsuspecting person. Fraudulent transactions have cost businesses and individuals millions of dollars.

Rapid Transactions Requires Positive Identification

With the rapid evolution of the worldwide web and e-commerce, the need for timely collection, transmission and reception of information has become a major concern to the average citizen, businesses and the government. To meet the promise of rapid transactions through the worldwide web, positive identification of individuals is required.

Many entities issue passwords to identify individuals. Some online entities ask individuals for personal information (mother's maiden name, secrete phrase, code word) to ensure the appropriate individual is granted access to information or approves a purchase. The number of passwords or information an individual must remember results in them being forgotten. The reissuing of passwords increases the administrative expense of operating an entity. Others, unable to positively identify an individual revert to paper, increasing response time. Even entities without online access require positive identification for rapid transactions.

Certifying Authorities and Digital Certificates

A digital certificate procedure, known as a "public key infrastructure (PKI)" as exemplified in the ANSI X 9.57 standard is built upon a public/private key "asymmetric" encryption/decryption scheme in a network environment. General asymmetric mechanisms (mathematical algorithms) are well known in the art, such as those invented by Rivest, Shamir and Adleman ("RSA"). A certifying authority (CA) issues, tracks and revokes digital certificates with an expiration date. A "private key" is issued to an individual and its corresponding "public key" is published.

In one type of asymmetrically coded or encrypted communication, the communication is encrypted using the public key, and only one recipient of the encrypted message may decipher the communication—the sole holder of the private key. This assures that there is only one recipient of decoded or deciphered information encrypted with the public key.

In another type of asymmetrically coded or encrypted communication, the communication is encrypted using the private key, held only by one sender, and any number of recipients of the encrypted communication may decipher the communication using the public key made available to them. This assures that there is only one sender of information encrypted with the private key that is decipherable with a given public key allowing recipients to uniquely associate that sender with that public key.

Validating a Digital Certificate

When a digital certificate needs to be validated several checks must be performed: (1) certificate expiration date; (2) searching the issuer certificate revocation list for the serial number to ensure that certificate has not been revoked because it has been lost or stolen; (3) CA digital signature must be validated with the issuer's public key to ensure that CA digital signature is authentic; and (4) the digital signature on the issuer's Certificate Revocation List (CRL) must be authenticated to ensure that it corresponds to the issuer of the certificate.

U.S. Pat. No. 5,960,083 Certificate Revocation System, the National Institute of Standard and Technology MITRE study indicates that a Directory of CRL can comprise thousands of digital certificates serial numbers and their revocation dates. Imagine if millions of digital certificates have been issued with short expiration dates such as one year. The CRL can contain millions of digital certificates serial numbers. Searching the certificate revocation list to determine the status of the certificate can be time consuming.

Digital Certificates Represent Individuals

CA's do not require positive proof of identity but rather assume that the individual identifying himself or herself, over the Internet, is indeed John or Jane Doe. This is understandable since digital certificates are being predominately used for encrypting email in software applications that follow the Secure Multipurpose Internet Mail Extensions (S/MIME) standard.

The passage of the E-signature bill gives digital contracts the same status as ink on paper. The bill does not indicate what type of authentication is legally binding. However, the technology behind digital certificates can be used to represent individuals electronically and to establish their identity to other parties. This allows for the authentication and securing of digital transactions. As such the digital certificate can be used to represent an individual's signature, grant access to information or facilities.

Certifying Authorities Evolving to Identify Individuals

Receivers of the digital certificate attach a level of confidence to the certificate based upon the CA's policies for issuing certificates. The public's trust and confidence in the CA's word is critical as the CA begins certifying individual identities. Especially when the new e-signature bill allows for electronic signing of legally binding documents.

Various methods of certifying an individuals identity have evolved: (1) through the use of a authentication hierarchy in which a CA verifies an individuals identity, then the CA's identity is verified by another certifying entity, until a well-known certifying entity known as the root CA certifies the CA below them; (2) CA authentication hierarchy that certifies individuals based upon the individual's geographical location; (3) organizations, who know the individual assign digital certificates, possibly resulting in individuals having multiple certificates; (4) the CA issues a digital certificate based upon an entity known as an issuing authority physically verifying an individual, the individual then downloads the certificate through the internet; and (5) combinations of the above identity verification processes.

The complexity involved with verifying an individuals identity results from the belief that no one CA has or is able to create the distribution infrastructure to identity individuals without intermediaries.

Lack of Trust Due to Complexity

This is about people believing in the identity of an individual to approve transactions such as legal documents and grant them access to information or facilities. Their trust in the CA identification of individual is critical in the use of this technology. The complexity and time involved with verifying the public key of a hierarchical CA undermines the public's confidence in the digital certificate. This requires the individual to verify the bottom CA, and then verify the public key of the next level CA, and then verify the public key of the next level CA until the individual verifies the root CA public key, a well-known CA.

The same lack of confidence exists in the use of an issuing authority. Even though the CA is well known, the lack of confidence in the issuing authority that is not known by the recipient of a digital certificate undermines the public trust in the digital certificate.

A Digital Certificate'S Private Key Used with a Smart Card

A new and emerging method of issuing digital certificates is through the use of a card with a microchip. The chip on the card can store either information or data. A reader that is connected to a computer or terminal reads the cards data. This type of card was first introduced as a card that stored value for pay phones.

As the technology developed, a card was developed for each type of usage. Usage includes storing value (dollars) for groceries, information such as buying preferences, micro-payments for such things as copiers, library card, a key to digital videos with an encryption for access, a key to machine setting of sensitive lab equipment, a key to lockers such as dispensers for drugs and tools, key to health club equipment, and with a digital certificate to replace passwords on a network.

The hierarchical CA process, which can require an employee's employer organization to certify an individual, and issue a card can results in an interesting people problem. The employer must retrieve the card from the individual once they leave the company since the card has information such as codes that grants them access to a company facility or information. The employer may be unable to retrieve the card or have to perform an extensive efforts to retrieve the card from possibly a disgruntle employee. Until the card is retrieved, the company is vulnerable to attacks especially since the employee has already lost their job.

Smart Card and Biometrics

Smart card technology is being combined with other technologies such as biometrics. Biometrics refers to the analysis of biological metrics—such as facial image, fingerprints, the eyes iris, or voice. For example, after inserting the smart card into a card reader with a fingerprint notch, the user inserts his finger into the notch for analysis instead of entering a password or a Personal Identification Number (PIN). If the analysis shows a match between the actual fingerprint and the fingerprint on the card, then access is granted.

Unfortunately, it has been discovered that someone's biometrics such as fingerprints or voice can be impersonated. Additionally, a person's iris can also be impersonated but at a greater expense than other forms of biometrics. The analysis of the increase in cost against the increase in security does not justify the expense of using smart cards with biometrics.

Multiple Applications and Cost

Smart cards are also being developed with applications that run on the card's microchip. They perform various functions such as banking, payment for pay phone access, maintain vender information, collect customer preference information, and contain an encryption key for a pay-per-view digital system all in one physical card (even one PIN). Some even have data files (tables) that maintain the information on the location of an application within the card. However, this is still a one to one form of communication where application A communications only with vender A and application B communications only with vender B.

The hierarchical CA process, which can require an employee's employer organization to certify an individual, and issue a multiple application card, has a unique problem. The card can contain applications for both personnel and corporate transactions. The employer must retrieve the card from the individual once they leave the company since the card has information that grants them access to company facilities or information. The employer may be unable to retrieve the card or have to perform an extensive effort to retrieve the card from possibly a disgruntle employee since the card is also used for personnel access. Until the card is retrieved or the application on the card that maintains the codes that allows access to company facilities is removed, the company is vulnerable to attacks especially since the employee has already lost their job.

More importantly, the more functions on the card, the greater the amount of memory needed on the card increasing the expense of the card. The cost of the card is limiting its acceptance in various applications.

People

In the technological fields above, wonderful things have been created that can enhance the quality of human life. However, human nature tends to prefer a simplistic instead of a complex idea. So many of these inventions have never materialized. In many cases, it is an issue of hiding the complexity so that people only see the inventions simple face.

Objects and Advantages

Accordingly, several objects and advantages of the present invention are:

(a) to provide a method of identification in which the applicant must show positive proof of identity, such as birth certificate, passport, driver's license, DNA or other acceptable forms of identification to a certifying authority that will validate the identity of the individual requesting a digital certificate;

(b) to provide a form of identification using a digital format that solves the problem of people forging identification cards using ordinary printers;

(c) to provide a digital form of identification which the public has confidence and trust in;

(d) to reduce the number of identification and access cards; assignment of passwords, phrase sentences and code words an individual must carry and maintain at all times;

(e) to provide a form of identification that can be used for multiple purposes by various entities on and off the Internet;

(f) to provide individuals, businesses, and the government the ability to identify an individual so that transaction time is decreased resulting in increased efficiency and cost savings;

(g) to provide a method of implementation that can take advantage of economies of scale to make the technology affordable to the majority of people.

Further objects and advantages of the invention will become apparent from a consideration of the drawings and ensuing description.

SUMMARY

In accordance with the present invention of a method and system for the identification of an individual using a multiple purpose card.

DRAWINGS

Drawing Figures

DETAILED DESCRIPTION

Description-FIGS. 1,2,3,4,6,7,8 and 9-Preferred Embodiment

There are two main concepts that need to be understood. The first is that the digital certificate goes beyond being an asymmetric encryption algorithm. It is a digital representation of an individual. Secondly, a multipurpose card performs a one to many communication of information. This card may be referred to as a common or a general card whose information is used for multiple purposes or transactions such as encryption, digital signing, e-commerce and access to facilities or information. Information can be any data or record in various industries such as financial information, trading information, health and government records, and legal communications. It is not developed for a particular application but rather it has been developed to support all of them.

Figure 1:
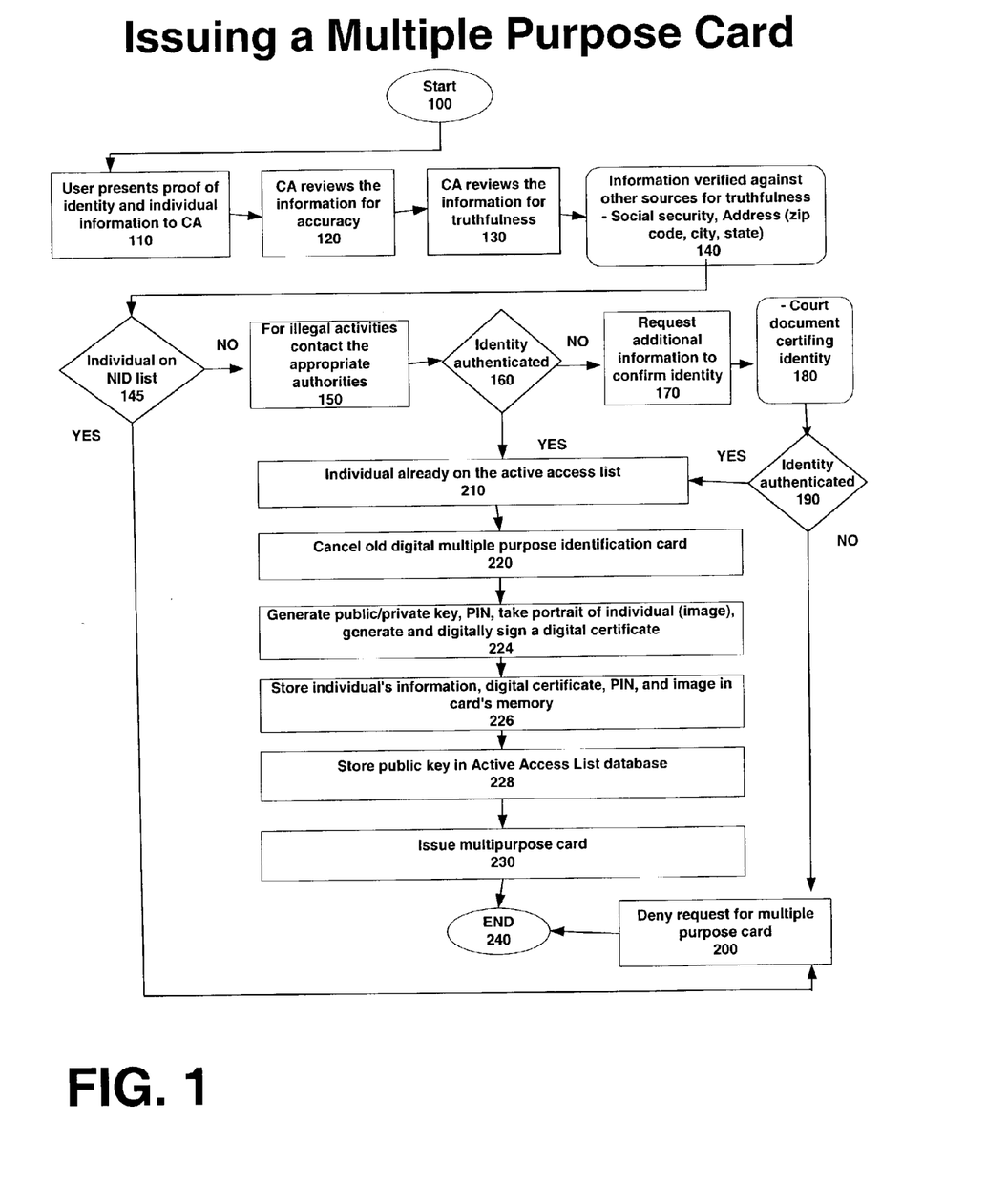
FIG. 1 shows a flow chart on the Issuing of a Multiple Purpose Card

The preferred embodiments of the invention encompasses:

1. Verifying an Individual's Identity (FIG. 1).

Provide a physical location whereby an individual can physically present information to prove their identity to another entity, referred to as a certifying authority for the purpose of issuing a multipurpose card.

A CA is responsible for determining the identity of an individual. A CA establishes a physical location for the purpose of allowing individuals to present "proof of identity" 100. If an individual is unable to physically present information at the CA's physical location, then the CA will go to the individual to review their identity information. Additionally, a CA can send notices reminding them that their card, referred to as digital identification card, is about to expire. Further description of the proof of identity and individual information needed to determine an individual's identity is described below.

Proof of Identity

Proof of identity consists of such information as birth certificate, social security card, driver's license, passports, court order documents, DNA, or other acceptable forms of identification. The preferred embodiments would consist of two forms of identification as listed above. As technology evolves what was once an acceptable form of identification may no longer be acceptable to the certifying authority.

However, it is up to the certifying authority to determine what is required to absolutely prove to them the identity of the individual.

Individual's Information

Basic information about the individuals will be gathered from them and stored in the administrative database. The information consists of the (1) individuals name; (2) address information; (3) social security number information; (4) gender information; (5) birth date information; (6) telephone number information; (7) citizenship information; (8) driver's license information and (9) personal information such as medical alert and donor information 110.

All proof of identity, and information will be gathered from the individual. This is a critical function that will ultimately determine third parties confidence and trust in the digital certificate representing an individual. The steps required to establishing an individual's identity and gathering relevant information may be done in any order. After a user provides the CA with the requested information, the CA must determine if the information provided by the individual is accurate and truthful.

Accuracy

Standard checks of the data are performed to ensure the information's accuracy. This would include initially checking for dirty data, which is data inputted or written incorrectly. The initial check would include checking to ensure the correct number of digits for the social security number has been given and all of the individual's information has been provided 120.

Truthfulness

After the accuracy of the data has been checked. The truthfulness of the data will then be checked 130. The social security information will be checked against active social security numbers and against the card's administrative database to ensure that the information agrees with previous information. The individuals name will be checked against the corresponding social security number. The individual's address will be checked against the address database (house address, city, state, zip code) to ensure that it is a valid address. A lie detector test may be given to the individual. The results of the data from the test will be analyzed to determine the truthfulness of the individual's information 140. For illegal activities such as attempts at impersonating other individuals, the proper authorities will be contacted 150.

No Identification Card to be Issued (NID)

The individual will also be checked against a list of people that cannot be issued an identification card, such as known terrorist, that we will refer to as no identification list (NID) 145. If the individual is on the list, then deny request for multiple purpose card.

Additional Information Requested

If verification of the individual's identity is shown to be invalid but truthful, then additional information will be requested 170 such as a court document certifying the individuals identity 180. An example would be when someone legally changes his or her name or physical gender.

2. Issuing a Multiple Purpose Card (FIG. 1)

If an individual's identity has been authenticated 160 then a multiple purpose identification card will be issued. If a valid card already exists for the individual 210 then the old card will be canceled 220 before a new card is issued.

A public/private key pair will be generated using the RSA asymmetrical encryption scheme (well known in the art), a digital picture will be taken of the individual, and a personal identification number (PIN) will be generated. The CA will then issue and digitally sign a digital certificate 224. The digital certificate with the image, individual's information (medical alert, private key, social security number), and a PIN 226 will be stored in the card's memory. The individual's corresponding public key is also stored in a database with access to the Internet referred to as the active access list 228. Further description of the image and PIN on the card is described below. The individual then receives 230 their card with information on where to call if they lose the card.

Image

This will require a camera that has the ability to digitize and transfer an image to a computer system, directly or indirectly. A digital camera is used to take a portrait of a human being. The photo can be stored in a photographic compact flash card (image storage device) or within the onboard camera's memory. The image is then transferred to the computer system. The computer system will then transfer the image to the digital identification card. For security reason, the image will be stored using the private key of the encryption scheme. It will not be displayed on the card.

Commercial cameras such as Kodak or Olympus are available on the commercial market. The preferred method is to use a camera, such as the Kodak DX3600, which has 8 MG of memory built into the camera. This camera comes with a docking station that plugs into the PC. After taking a picture of the individual, insert the camera into the docking station, and push a butting to transfer the image to the computer system. Using software that allows you to view the image, open the image. View the image on the computer system to ensure that you took a good picture and then crop the image. Convert the image to 8 bit gray scale. The goal is to reduce the image to less than 32 KB. The image is then encrypted using the private key and incorporated into the digital certificate. The smart card is then inserted into the card reader. The digital certificate is then transferred to the protected memory section on the card.

PIN

Many smart cards are available on the commercial markets that have the software and hardware that require a personal identification number (PIN) for the access code. The Litronic's NetSign card for Windows is a smart card that requires a PIN. The manufacturer's PIN is initially stored on the card. After inserting the card into the card reader. The individual will then enter a personal identification number (PIN), 8 characters in length, of their choosing through a keypad attached to a computer system or a terminal connected to a computer system through a network. The new PIN will then be transferred to the card. The characters that can be used are the numerals 0 thru 9, the alphabet, and special characters such as $, <, >. The protected memory of the card cannot be accessed by the microprocessor without the PIN. The PIN will be used to encrypt and decrypt data in the protected memory of the card so that modification of the PIN renders the data useless. Additionally, if the PIN is entered incorrectly 5 times, the PIN will overwrite the protected memory of the card. This effectively makes the card unusable.

Denying Request for a Multiple Purpose Card, if an Individual's Identity Cannot be Verified If the individual's identity cannot be validated, then the request for a digital identification multiple purpose card will be denied until sufficient proof of identity can be demonstrated 200.

3. A Public Key Infrastructure (PKI) System in Which a Multiple Purpose Digital Identification Card with a Digital Certificate is Used to Represent an Individual.

A certificate procedure, well known in the art, is a PKI as described in the X9.57 standard. However, this system only issues and revokes digital certificates on a multipurpose card that represent an individual. We do not track the certificate as it moves through the various stages of its existence.

Asymmetric Encryption

A PKI uses asymmetric key algorithms, which contains two distinct keys for the authentication of identities and for distributing relatively small amounts of information (digital certificate, personal information, medical alert/donor information) from one entity to another. A mathematical algorithm creates two keys that are linked, known as the public and private key. They are used for the encryption and decryption of a transaction. General asymmetric mechanisms are well known in the art, such as those invented by Rivest, Shamir and Adleman ("RSA") and the elliptic curve. This system is not limited to a particular protocol or algorithm though the preferred algorithm is RSA.

Figure 2:
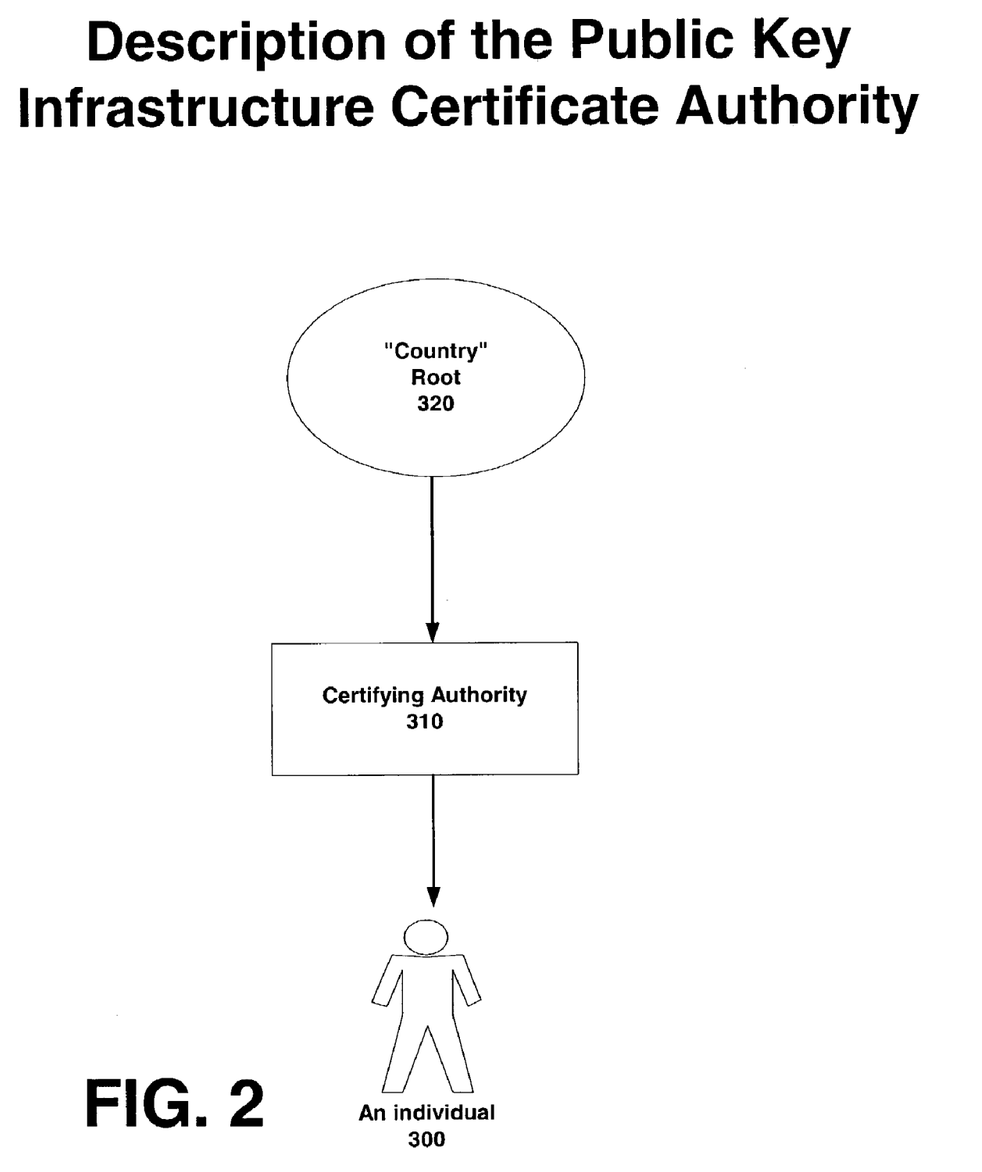
FIG. 2 shows a description of the Public Key Infrastructure Certificate Authority hierarchy

Certification Authority (FIG. 2)

A certificate authority 310, which has a CA path directly to the "Country" root authority 320, is the only entity responsible for registering and certifying an individuals identity 300. An individual submits a request to the CA for a digital certificate. The CA provides the administrative functions necessary to validate the identity of an individual. Upon validation of an individual's identity and information, a public/private key pair is generated. The public key becomes part of the digital certificate. The CA digitally signs the digital certificate. This certificate is then made available to the public. Additionally, the CA transfers the digital certificate and personal information (medical alert, private key, social security number) to a multiple purpose card.

Figure 3:
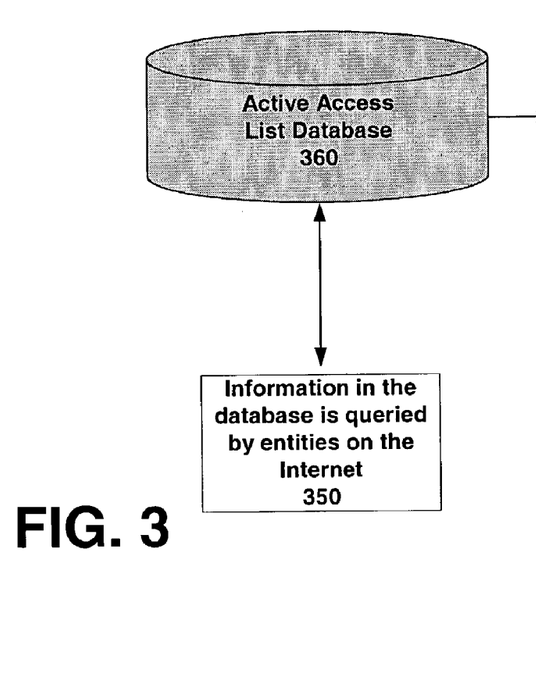
FIG. 3 shows a description of the Public Key Infrastructure Active Access List

Active Access List (FIG. 3)

A copy of the public key is transferred to the Active access list (AAL) database, which has access to the Internet. The AAL database 360 contains the current data and time, individual's social security number and the corresponding individual's public key for all valid digital certificates. Other entities can query the database 350 using the individual's serial number through the Internet to determine if the key is valid and update their public key list with the individual's new public key, if necessary.

Queries based on the public key can also be done on the database to determine if the key is still valid. As a public key is revoked, it is removed from the database thus the key is not valid. The database will not track the public key through its movement from its initial issuance to its expired state. Information such as when or if the public key existed and its expiration date will not be maintained in the database. The tracking information helps support the long-term proof of digital signatures on electronic documents, which can be, accomplished more effectively outside of the AAL database.

A Second Embodiment of the AAL Database

A copy of the digital certificate is transferred to the Active access list (AAL) database, which has access to the Internet. Other entities can query the database 350 using the individual's digital certificate through the Internet to determine if the certificate is valid.

The CA will also maintain an administrative database that contains the personal information plus any other relevant information.

Figure 4:
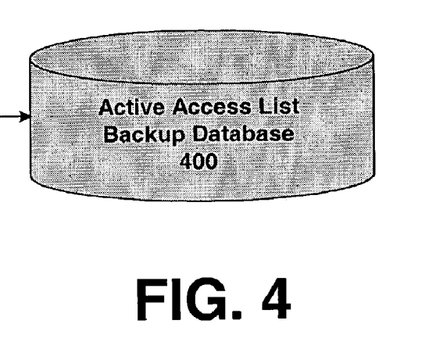
FIG. 4 shows a description of the Backup System for Active Access List

Backup Active Access List (FIG. 4)

A mirror copy of the database is maintained as backup to assume the place of the primary active access list database if an entity is unable to access the primary database 400. A connection directly or through a network (primary computer is connected to a CISCO router which is then connected to a T-1, T-2, or T-3 line that consists of a private network in which a secondary computer system is also connected to a CISCO router with a connection to a T-1, T-2, or T-3 line that is then connected to the same private network) is maintained between the primary system and the backup system. This facilitates the transfer of information updates made on the primary system to the backup system. The preferred method is through a private network.

Figure 5:
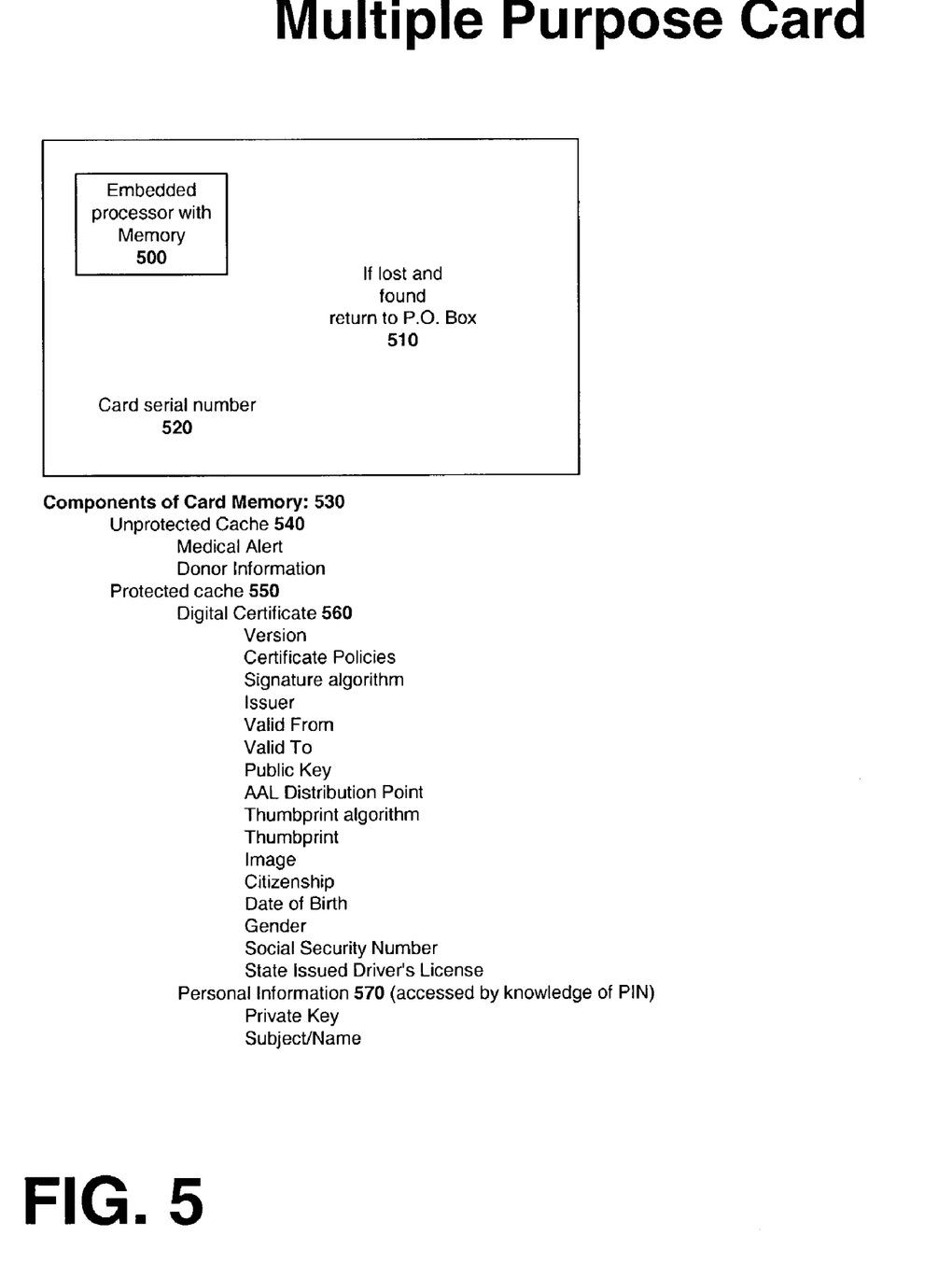
FIG. 5 shows a drawing of the Multiple Purpose Card

Card (FIG. 5)

The certificate authority then encodes the digital certificate and personal information into a smart card that has a microprocessor embedded within the card 500. Access to specific information in the card is controlled by the card's internal Operating System that in this case contains a PIN, and the programmed permissions set in the card. The issuer sets all files and permission to these files in advance. The only access to the cards is through the operating system. There are no back doors, no reconfiguration of file structures on the card. Data is read or written to the card through permissions on the card set by the issuer.

The purpose of the card is for the digital certificate within the card to represent an individual 530. There are several smart cards available on the commercial market such as Cardlogix, Marx, and Cryptoflex manufactured by Schlumberger. The smart card's operating system will set the data on the card to read only. There are two sections within the card: unprotected cache and protected cache. Unprotected cache contains information that anyone can read 540. The protected cache 550 contains the digital certificate 560 and personal information 570. The digital certificate can be read by anyone but the personal information requires knowledge of the PIN for access. If the PIN is entered incorrectly 5 times, then the PIN will overwrite (delete) the information in the protected cache making the card unusable. The preferred card is the Cryptoflex for Windows with more than 32 k of memory.

Several CryptoAPI's are available for usage. In this case, we are using the Microsoft CryptoAPI to interface with the cryptographic modules called cryptographic service providers. The cryptographic service providers contain the cryptographic algorithm. The Microsoft CryptoAPI can be cumbersome to work with so interfaces to the Microsoft CryptoAPI have been created. Microsoft created CAPICOM, Peter Gutman created Cryptlib, and Richard Bondi with associates created WCCO.

Richard Bondi's book, "Cryptography for Visual Basic, A Programmer's Guide to the Microsoft CryptoAPI", describes how to interface a visual basic program to the Microsoft CryptoAPI's by building a cryptographic program interface to the Microsoft CryptoAPI (Bondi built WCCO). This requires converting data types from C language (Microsoft CryptoAPI's are written in C language) to Visual basic language (the programs data entry screens and data are formatted in visual basic data types). We are using visual basic programming language for the data entry screens because of its ability to work with images. Bondi's book describing how to integrate Microsoft CryptoAPI's into a visual basic program as a DLL is available online at www-.wiley.com/compbooks/bondi or from the publisher John Wiley & Sons.

Bondi's has open source code with an open license to modify the software allowing you to create an identification card. Its intuitive objects are easy to use and the visual basic labels (labeled step 1, step 2, etc.) allow you to understand how to use Microsoft CryptoAPI's for encryption, decryption, signing, and creating digital certificates using various digital certificate combinations such as initialization vectors, type of encryption keys (symmetric, asymmetric), generating a key pair and other cryptographic functions.

Let's say you want to create an identification card for Alice using Visual Basic and the WCCO software. You would first choose a cryptographic service provider (CSP which creates a two key containers) from the CryptoAPI providers, which is an algorithm module. An example is the Microsoft Enhanced Provider. You would then load this provider. Next, you would create an encrypted key pair. The key pair is to be used for identifying Alice.

Create an instance of the id object. The id object contains the variables (data you previously collected such as the individuals name), which will be loaded into the smart card. As for the picture, you would use a camera to take a picture of the individual and save or copy the picture onto the computer. The IBM PC camera has the Windows API interface written so the image can be directly inserted into the visual basic picture or image box without having to open a file. Another method is to load the file (picture or image data from the computer) into the visual basic picture box.

The preferred embodiment of this invention is to load the public key and public information to include the image and the information of the id object into the smart card with read only option on. This is done using the smart card's security system. Load the private key with the individuals name into a file protected with Read only option and encrypted (using Cardlogix Winplex API cryptographic routines and a smart card with encryption capability). You can also protect this file using a Personal Identification Number (PIN).

Information on how to load the data into the smart card is found in Cardlogix User Manual. Additionally, the Cardlogix web site contains software program examples, which can be modified for use with this invention. Ignore the Cardlogix software application features built for mult-application type of architecture.

There are many ways those in the art can do the above. Another embodiment is to hash (use the hash function to hash the data in order to produce a hash value) the data from the ID object (text data/string variables) using the cryptographic service provider. Next, hash the image. Concatenate both hash values. Hash the concatenated value with Alice's private key. Load the concatenated hash value (encrypted with the private key) and the public information into the smart card, in this case the Cardlogix smart card protected file. Another embodiment is loading the information into a memory card using software encryption to encrypt (protect) the information. Load the hash value of the private key into another file in the Cardlogix smart card. Load the PIN into another file. This embodiment causes the external programs working with the id smart card to be more complex and it requires more time to decrypt/encrypt, decrypt/encrypt, decrypt/encrypt, etc. This is not the preferred embodiment.

The information within the card can be loaded with tag headers; it can be comma delimited, or another method, which allows the variables (name, date of birth) to be identified from each other.

An individual identifies himself or herself by presenting his or her card. The card is inserted into a card reader. A software program then reads the public only information in the card (including the picture) on a laptop, computer, phone, or any external device, which can display information read from the card to include the picture. It's important for the picture to be displayed because using a CRL with this invention has problems.

The party being presented the identification card can accept it as being valid using the personal information (image/picture) against the actual individual, or automatically by matching information such as the public key against the AAL database, organizational or company information. Additionally, the party can verify who issued the card by verifying the identity certifying authority key against the AAL database or another web site. The level of verification done is based upon the party's decision and the levels of risk the party feels comfortable assuming.

The card will physically contain the information on where to send the card if found 510 and the card's serial number (primarily for the purpose of audits) 520.

Figure 6:
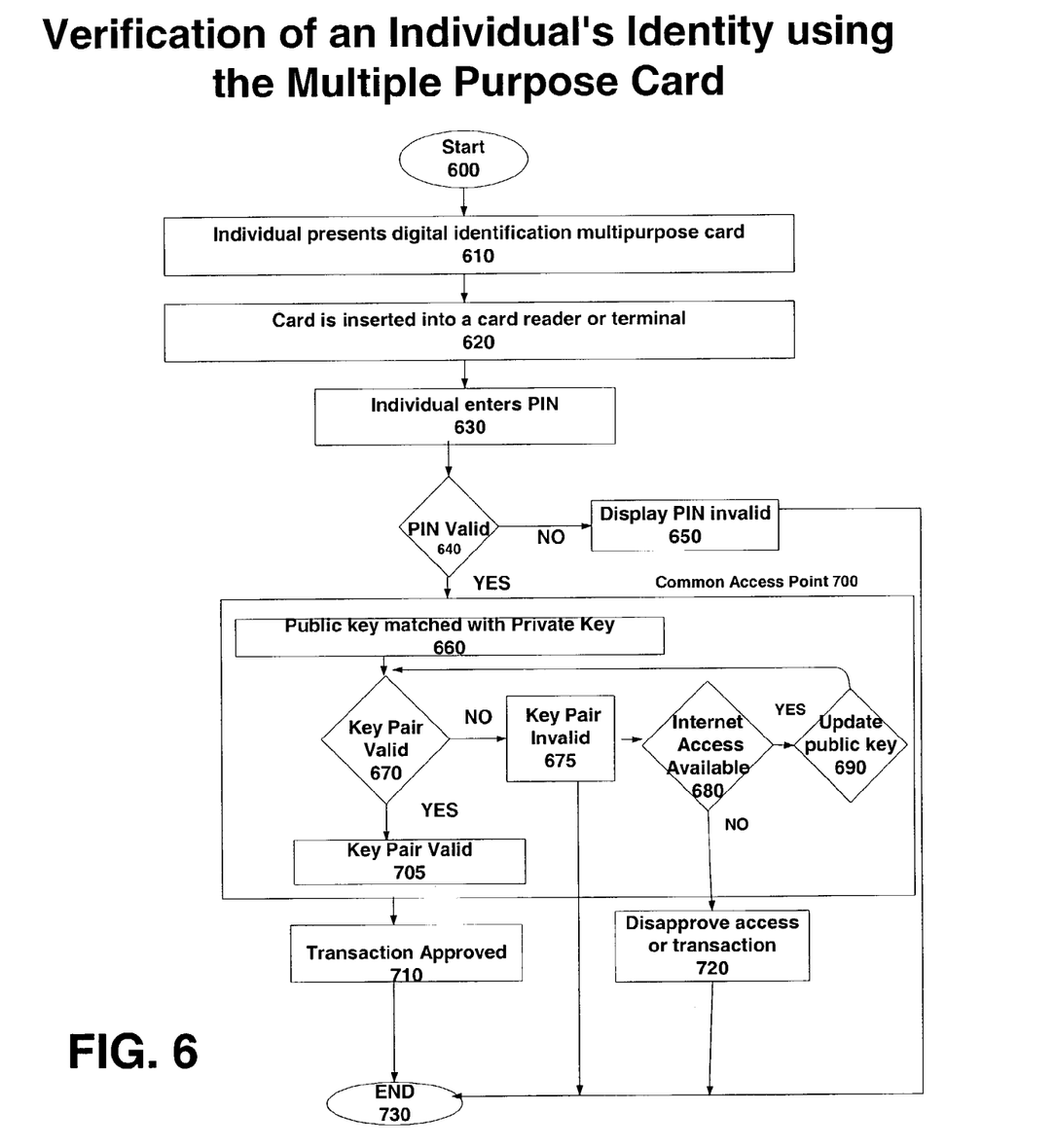
FIG. 6 shows a flow chart on the Verification of an Individual using the Multiple Purpose card

4. Verification of an Individual's Identity Using the Multiple Purpose Card (FIG. 6).

There are two main concepts to understanding verification: permission and due diligence. In order to access a system such as a computer system or a program, permission is first established between the individual and the owners of the system such as a web site or program. Usually, a form with the individual's information is filled out, given to the administrator of the system, and then the administrator determines what permission to grant the individual. This may require determining what is your credit worthiness so you can perform financial transactions such as buying stock on margin. The administrator will then grant access to individual using their digital identification card to the system instead of giving the individual a user id and password. The process of establishing permission is beyond this invention of identifying an individual using a multiple purpose card.

The second concept to understand is due diligence. The entity using the digital identification card in their process is responsible for ensuring the validity of the individual's public key or for requesting the individual's PIN on the digital identification card. This invention provides a PIN, digital certificate and information, but due diligence must be performed by said entity to validate the digital identification card with the information on the card or through the CA.

An individual presents a multiple purpose digital identification card to an entity 610. The card is inserted into a card reader 620 attached to a computer or terminal with a keypad. The individual enters a PIN into the keypad 630. Several card readers are available on the commercial market such as a 210 reader from Litronic's. The card reader determines if the PIN is valid 640. If PIN is not correct, then PIN invalid is displayed 650. If the PIN is valid then the operating system on the card will open, for read only, the personal information. The common access point will read the private key 700 and match the public key with the private key 660. If the key pair is not valid 675, and Internet access is available 680, the public key is updated 690 from the AAL database. If no Internet access is available, then indicate key pair is not valid 675. If the key pair is valid 670, then the then indicate that the key pair is valid to the entity requesting verification of the digital identification card. The entity approves the transaction by the individual on the system or in the program as indicated 710. Otherwise, it disapproves the transaction 720.

Figure 9:
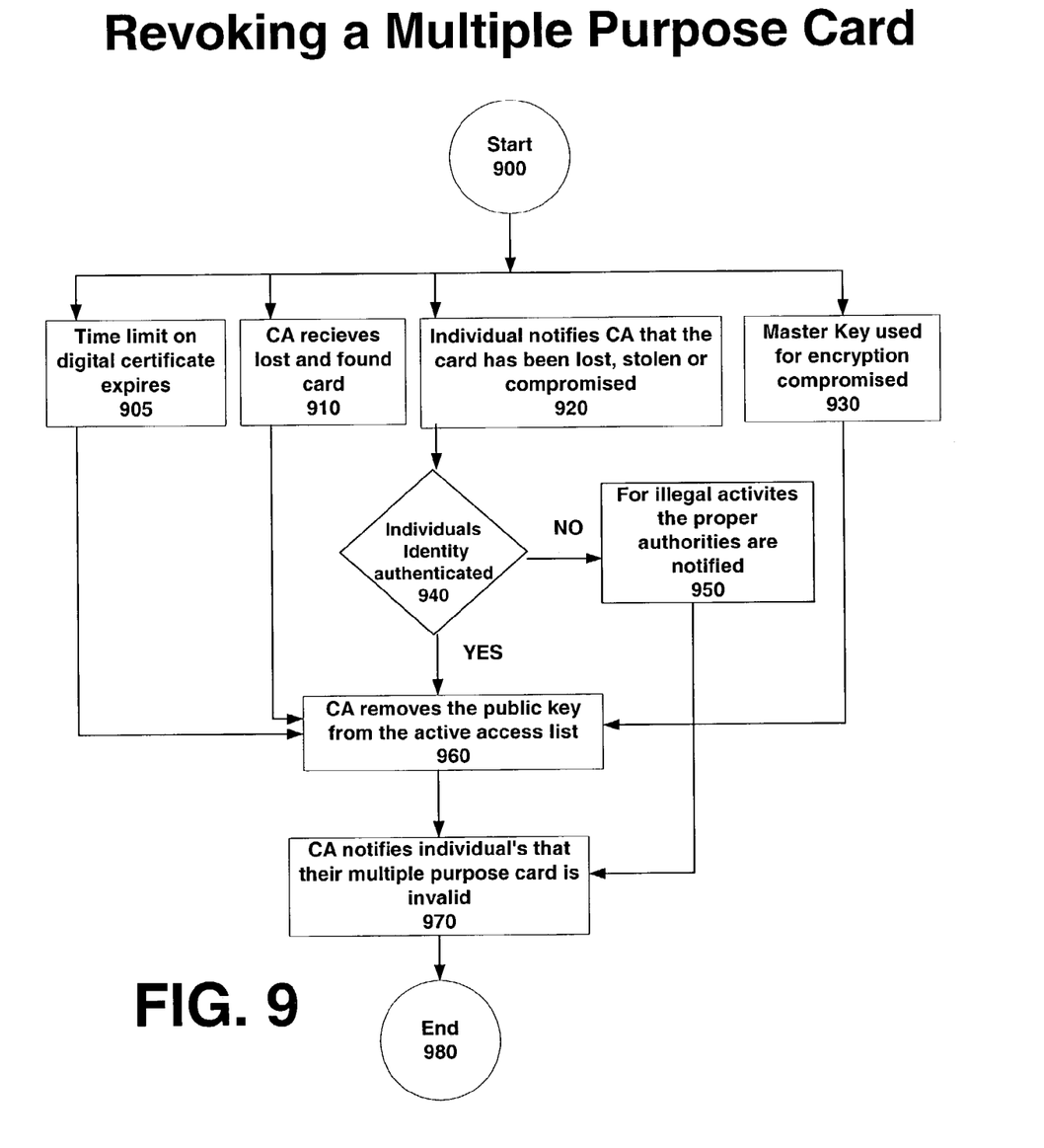
FIG. 9 shows a flow chart on the Revoking of a Multiple Purpose Card

5. Revoking a Multiple Purpose Card (FIG. 9).

There are four main reasons for revoking a card: (1) time limit on digital certificate has expired; (2) CA receives lost and found card by someone else; (3) individual notifies the CA that his or her card has been lost, stolen or compromised; and (4) the CA's master key used for encryption has been compromised.

Time Limit

No encryption is unbreakable. It's only a matter of time before someone breaks it. For security purposes, the digital certificate is valid for a specific amount of time. In this case, for only one-year. After the one-year, the public key is revoked 905.

Lost and Found

The card indicates if it is lost and found to return the card to a certain mailing address. When the CA receives the card 910, the public key associated with the card's serial number or digital certificate is removed from the active access list 960. The CA notifies the individual that their card is invalid 970.

Card Lost, Stolen or Compromised

An individual notifies the CA that the card has been lost, stolen or compromised 920. The CA validates the identity of the individual 940. For illegal activities such as impersonating someone else, the proper authorities are notified 950. Upon validation, the CA removes the public key from the active access list 960 and notifies the individual that their multipurpose digital identification card is invalid 970.

Master Key Compromised

If the master key used for generating the keys has been compromised 930 or if the CA feels that it cannot guarantee the individual's identity then the CA can remove the affected public keys from the active access list 960. The CA will then notify the individual that their multiple-purpose card is invalid 970.

Advantages

From the description above, a number of advantages become evident:

(a) Multiple digital certificates will not be issued to an individual based upon his or her functions such as private citizen, employee, and member of different organizations;

(b) Increase speed and efficiency in determining validity of a digital certificate serial number since a database of only active public key serial numbers needs to be searched to determine validity;

(c) No validation of a long certification authority path is required to determine if the digital certificate key has been revoked;

(d) Ability to mass produce a large quantity of the same type of card resulting in a lower cost per card;

(e) The lower cost per card results in a cost savings in the implementation of this type of technology;

(f) Ability of small to mid-size companies, with few employees, to leverage this technology to increase operational efficiency. For example, the small businesses will have reduced password administration cost for all their systems since access will be done through the multiple purpose card;

(g) Employers do not have to retrieve a card from an employee who is no longer with the company or be vulnerable to an attack by a disgruntle employee if they can't retrieve the card which granted the employee access to company information or facilities;

(h) Provide a more efficient method of identifying individuals and ensuring known terrorists do not board planes;

(i) The digital identification card increases security within a company since both physical possession of the card and a PIN is required to access information or facilities. Security is dramatically improved since most people will not steal if it can be proved that it was them who accessed the information or facility;

(j) Stolen identities are reduced since the individual's information such as social security number and image is in a digital format. This information is not accessible without the individual entering a PIN and having possession of the card;

(k) If a card is lost, an individual is highly motivated to report it since the card is used for many functions;

(l) Increase in transactions that can be performed electronically reducing the amount of mail processed. This reduces the impact that biological terrorist attacks on the mail distribution system can affect the economy.

Figure 7:
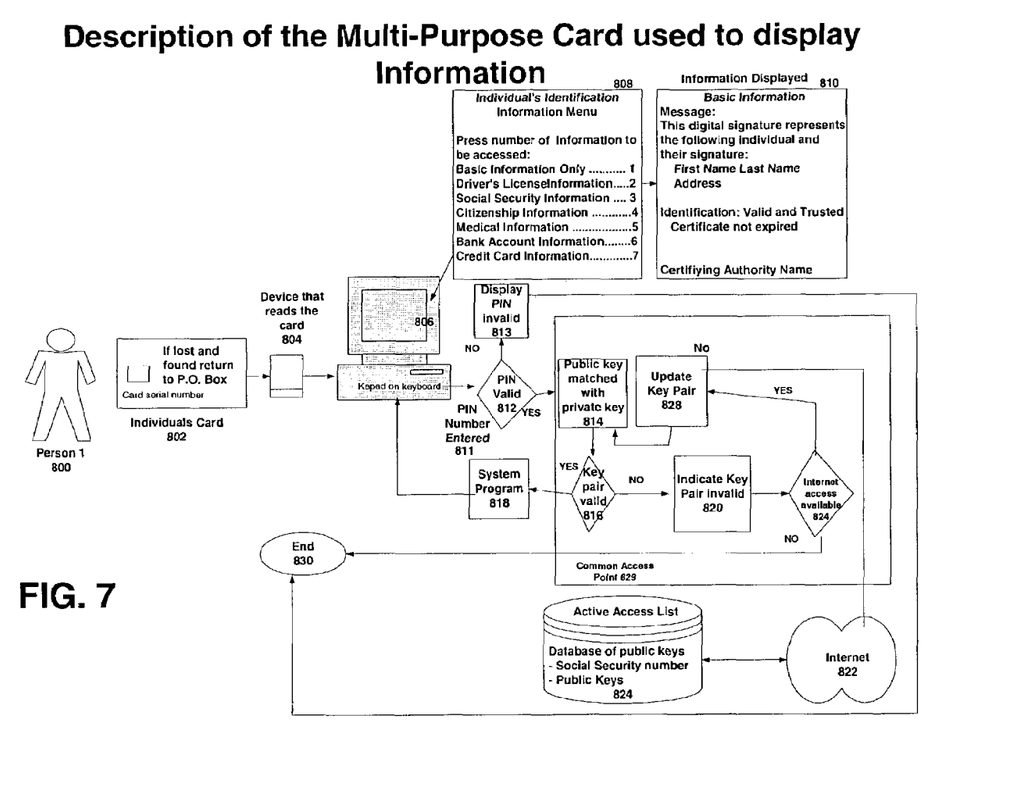
FIG. 7 shows a description of the Multiple Purpose Card used to Display Information
Figure 8:
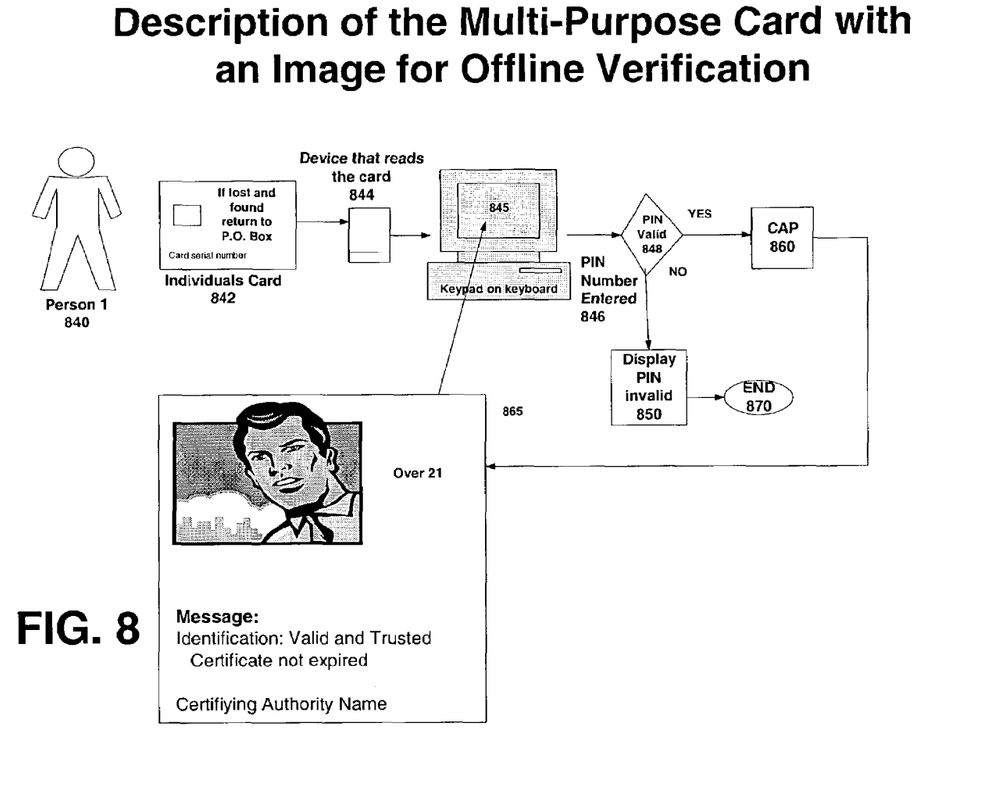
FIG. 8 shows a description of the Multiple Purpose Card used to Display an Image

Operation-FIGS. 7,8

An individual (FIG. 7) 800 inserts their card 802 into a card reader 804 connected to a computer or terminal. Using the keypad on the computers keyboard, the individual enters their PIN 811. Then a determination is made if the PIN is valid 812. If the PIN is invalid, then PIN invalid is displayed 813 and the process ends 830. If the PIN is valid, then the card's file is opened for read only access. The public key is then matched with the private key 814. If the key pair is valid 816 then the Common Access Point (CAP) 829 indicates the key pair is valid to the system program 818 that determines what transactions are permitted. In this case, the CAP program reads the identification information on the card and matches it with the information from within the computer system. The information is then displayed on the screen 806 where a menu is displayed 808 that allows the individual to determine what data (combined from information on the card with information on the system or system program being accessed) is to be displayed 810. Examples include matching the individuals private key with the public key associated with some information on the computer system such as medical or bank account or credit card information or social security information on the computer.

If the key pair is invalid, then invalid key pair is indicated 820. A determination is made if Internet access is available 824. If Internet access is available then the public key can be updated 828 through the Internet 822 by accessing the AAL database 824. This requires the CAP to have access to the AAL database directly or through a network connection such as a modem, T-1, wireless, or satellite. The database is searched based on the individual's serial number. The public key is retrieved and a copy is sent to the CAP. The public and private keys are then matched to determine if the key pair is valid 814. If the key pair is invalid then the process ends 830.

In another example, (FIG. 8) an individual 840 inserts their card 842 into a card reader 844 connected to a computer system or terminal 845. Using the keypad on the computers keyboard, the individual enters their PIN 846. If the PIN is valid 848, then the card's file is opened for read only access. The Common Access Point Program 860 then decrypts the image using the private key and reads the information on the card. The entity requesting verification of the digital identification card grants permission for transactions. If the PIN is invalid, then display PIN invalid 850 and end process 870.

In this case, a program on the computer 845 determines the age of the individual and whether they are over 21. It then displays the information from the card (image and whether they are over 21) 865 onto the computer screen 845.

The card only provides the individual's identification. The entity requesting verification determines what permissions or transaction is allowed and is beyond this patent.

CONCLUSION, RAMIFICATIONS, AND SCOPE

Thus the reader will see that the invention of identifying individuals provides an infrastructure that industries can leverage to reduce the cost of operations and speed up transactions. Creating economies of scale for the card and shifting the access control to the computer system (example: a virtual site which consists of a server on the Internet with an operating system) creates this infrastructure.

There are many attempts to develop a card to be used for various types of transactions such as approve for a transaction and access to facilities or information. Some use parts of our invention but none have replaced the cards that we carry in our wallet. The smart card technology is the most promising platform technology for the creation of a true identification card.

Currently, smart cards with individual applications or multiple applications have been designed. However, this does not reduce the cost of the card. An individual or business must either purchase numerous cards or buy an expense card with a large amount of memory. The small quantity purchase, by type of card, does not provide a reduction in price due to quantity.

By developing a card that identifies an individual and shifts the access control to the computer system, economies of scale can be achieved. This allows people and business, in particular small businesses, the ability to reduce costs and decrease transaction time since the initial implementation cost for the card is lower.

While the above description contains many specifications, these should not be construed as limitations on the scope of the invention, but rather as an exemplification of one preferred embodiment thereof. Accordingly, the scope of the invention should be determined not only by the embodiments illustrated but by the appended claims and their legal equivalents.

Although the present invention has been described in detail, it should be understood that many other variations are possible to one skilled in the art without departing from the spirit and scope of this invention.

What is claimed is:

1. A method of identifying people comprising:
   a. providing a card to be used for multiple purposes with means of performing a one to many communication of information and,
   b. said card contains a processor with means of storage,
   c. requesting information on an individual,
   d. validating said individual's identity by verifying individual's information against other data,
   e. storing said individual's information in said card,
   f. issuing said card to said individual,
   g. inserting a card into a device with means of reading the data in said card,
   h. revoking said card when the card is no longer valid,
   i. storing of said public key associated with an individual in an active access list with means of being accessed by others, whereby said card can be used as proof of said individual's identity.

2. A method of identifying people comprising:
   a. providing a card to be used for multiple purposes with means of performing a one to many communication of information and,
   b. said card contains a processor with means of storage,
   c. requesting information on an individual,
   d. validating said individual's identity by verifying individual's information against other data,
   e. storing said individual's information in said card,
   f. issuing said card to said individual,
   g. inserting a card into a device with means of reading the data in said card,
   h. revoking said card when the card is no longer valid,
   i. storing of said digital certificate in said card,
   j. storing of said public key associated with an individual in an active access list with means of being accessed by others,
   k. inserting said card into a device with means of reading the data in said card consisting of said digital certificate, whereby said card can be used as proof of said individual's identity.

3. A method of identifying people comprising:
   a. providing a card to be used for multiple purposes with means of performing a one to many communication of information and,
   b. said card contains a processor with means of storage,
   c. requesting information on an individual,
   d. validating said individual's identity by verifying individual's information against other data,
   e. storing said individual's in said card,
   f. issuing said card to said individual,
   g. inserting a card into a device with means of reading the data in said card,
   h. revoking said card when the card is no longer valid,
   i. generating a digital certificate to be associated with an individual with means of storing said private key within the digital certificate,
   j. storing of said digital certificate in said card,
   k. storing of said public key and social security number associated with an individual in the active access list with means of being accessed by others, whereby said card can be used as proof of said individual's identity.

4. A method of identifying people comprising:
   a. providing a card to be used for multiple purposes with means of performing a one to many communication of information and,
   b. said card contains a processor with means of storage,
   c. requesting information on an individual,
   d. validating said individual's identity by verifying individual's information against other data,
   e. storing said individual's in said card,
   f. issuing said card to said individual,
   g. inserting a card into a device with means of reading the data in said card,
   h. revoking said card when the card is no longer valid,
   i. generating a digital certificate to be associated with an individual with means of storing said private key within the digital certificate,
   j. storing of said private key and image associated with said individual in said digital certificate,
   k. storing of said digital certificate in said card,
   l. storing of said public key and social security number associated with said individual in an active access list accessible by others, whereby said card can be used as proof of said individual's identity.

5. A method of identifying an individual comprising:
   a. providing a card to be used for multiple purposes with means of performing a one to many communication of information and,
   b. said card contains a processor with means of storage,
   c. requesting information on an individual, d. validating said individual's identity by verifying individual's information against other data,
e. storing said individual's information in said card,
f. issuing said card to said individual,
g. inserting a card into a device with means of reading the data in said card,
h. revoking said card when the card is no longer valid,
i. generating an image of said individual with a device with means of transmitting the image to another device consisting of:
   1. a processor and
   2. means of storing information,
j. generating a digital certificate to be associated with the individual with means of storing said individual's image within the digital certificate,
k. storing of said digital certificate in said card, whereby said card can be used as proof of said individual's identity.

6. A method of identifying an individual comprising:
a. providing a card to be used for multiple purposes with means of performing a one to many communication of information and,
b. said card contains a processor with means of storage,
c. requesting information on an individual,
d. validating said individual's identity by verifying individual's information against other data,
e. storing said individual's in said card,
f. issuing said card to said individual,
g. inserting a card into a device with means of reading the data in said card,
h. revoking said card when the card is no longer valid,
j. inserting a card into a device with means of writing a personal identification number in said card associated with said individual,
k. entering said personal identification number into a keypad attached to a device with means of communicating with said card,
l. storing said personal identification number in said card,
m. providing a display with means of displaying said individual's image when the said personal indentification number is entered correctly into the keypad, whereby said card can be used as proof of said individual's identity.

7. A method of identifying individuals comprising:
a. providing a card with a processor to be used for multiple purposes with means of performing a one to many communication of information,
b. providing computing means which will:
   1. access the data in said card associated with an individual and
   2. reading the data in said card and
   3. read the private key in said card associated with an individual and
   4. match a private key in said card with a public key in an active access list and
   5. indicate if key pair match has been found, whereby said card can be used as proof of the individual's identity.

8. A method of identifying individuals comprising of:
a. providing a card with a processor to be used for multiple purposes with means of performing a one to many communication of information,
b. providing computing means which will:
   1. access the data in said card associated with an individual and
   2. reading the data in said card and
   3. read an image and private key in said card and
   4. match a private key in said card with a public key in a common access point program and
   5. request updates of the public key from a database which contains all valid public keys referred to as active access list and
   6. indicate whether the private and public key match, whereby said card can be used as proof of the individual's identity.

* * * * *